United States Patent
Serov et al.

(10) Patent No.: US 9,812,719 B2
(45) Date of Patent: Nov. 7, 2017

(54) MIXED-REACTANT FUEL CELLS WITH SELECTIVE ELECTRODES

(71) Applicants: Alexey Serov, Albuquerque, NM (US); Plamen B Atanassov, Santa Fe, NM (US); Elod Gyenge, Vancouver (CA); Amin Aziznia, Vancouver (CA)

(72) Inventors: Alexey Serov, Albuquerque, NM (US); Plamen B Atanassov, Santa Fe, NM (US); Elod Gyenge, Vancouver (CA); Amin Aziznia, Vancouver (CA)

(73) Assignee: STC.UNM, Albuquerque, NM (US)

(*) Notice: Subject to any disclaimer, the term of this patent is extended or adjusted under 35 U.S.C. 154(b) by 90 days.

(21) Appl. No.: 14/774,762

(22) PCT Filed: Mar. 11, 2014

(86) PCT No.: PCT/US2014/023559
§ 371 (c)(1),
(2) Date: Sep. 11, 2015

(87) PCT Pub. No.: WO2014/164822
PCT Pub. Date: Oct. 9, 2014

(65) Prior Publication Data
US 2016/0020475 A1 Jan. 21, 2016

Related U.S. Application Data

(60) Provisional application No. 61/776,437, filed on Mar. 11, 2013.

(51) Int. Cl.
*H01M 8/04* (2016.01)
*H01M 4/90* (2006.01)
(Continued)

(52) U.S. Cl.
CPC ....... *H01M 8/04104* (2013.01); *H01M 4/861* (2013.01); *H01M 4/8605* (2013.01);
(Continued)

(58) Field of Classification Search
None
See application file for complete search history.

(56) References Cited

U.S. PATENT DOCUMENTS 8,709,680 B2   4/2014   Oloman
2006/0078782 A1   4/2006   Martin et al.
(Continued)

FOREIGN PATENT DOCUMENTS

KR   20080078377 A   8/2008

OTHER PUBLICATIONS

Saha et al. "High performance polymer electrolyte fuel cells with ultra-low Pt loading electrodes prepared by dual ion-beam assisted depositoin." Electrochimica Acta. 51 (2006) p. 4680-4692.*
(Continued)

*Primary Examiner* — Patrick Ryan
*Assistant Examiner* — Christopher Domone
(74) *Attorney, Agent, or Firm* — Gonzales Patent Services; Ellen M. Gonzales

(57) ABSTRACT

A mixed reactant fuel cell (MRFC) including a MRFC-optimized electrocatalyst utilizing a combination of selective catalysts and selective fuel distributors.

14 Claims, 10 Drawing Sheets

(51) Int. Cl.
    *H01M 4/88*      (2006.01)
    *H01M 4/86*      (2006.01)
    *H01M 8/04089*   (2016.01)
    *H01M 8/1004*    (2016.01)
    *H01M 8/0234*    (2016.01)
    *H01M 8/0245*    (2016.01)

(52) U.S. Cl.
    CPC ....... *H01M 4/8821* (2013.01); *H01M 4/8828* (2013.01); *H01M 4/9008* (2013.01); *H01M 8/0234* (2013.01); *H01M 8/0245* (2013.01); *H01M 8/1004* (2013.01)

(56) References Cited

U.S. PATENT DOCUMENTS

| | | | |
|---|---|---|---|
| 2008/0063909 | A1   | 3/2008  | Preistnall et al. |
| 2008/0248362 | A1 * | 10/2008 | Sayre .................. H01M 4/8605 429/535 |
| 2010/0167106 | A1 * | 7/2010  | Pak .................... H01M 4/8814 429/525 |
| 2011/0171555 | A1   | 7/2011  | Olomon et al. |
| 2013/0171527 | A1 * | 7/2013  | Lanning ................ H01M 4/861 429/405 |

OTHER PUBLICATIONS

Aziznia et al. A Swiss-roll liquid-gas mixed-reactant fuel cell Journal of Power Sources 212 (2012) 154-160.
Calabbrese Barton et al. Mixed-Feed Direct Methanol Fuel Cell: Materials and Design Solutions, ECS Transactions, 1 (6) 315-322 (2006).
Aziznia et al. Platinum- and Membrane-Free Swiss-Roll Mixed-Reactant Alkaline Fuel Cell ChemSusChem 2013, 6, 847-855.
Cheng et al. A liqui=gas phase mixed-reactant fuel cell with a RuSeW cathode electrocatalyst Journal of Power Sources 183 (2008) 678-681.
Kothandaraman et al., Methanol Anode Modified by Semipermeable Membrane for Mixed-Feed Direct Methanol Fuel Cells, Journal of The Electrochemical Society, 155 (9) B865-B868 2008.
Meng et al. Selective Cathode Catalysts for Mixed-reactant Alkaline Alcohol Fuel Cells FUEL CELLS 06, 2006, No. 6, 447-450.
Priestnall et al. Compact mixed-reactant fuel cells Journal of Power Sources 106 (2002) 21-30.
Shukla et al. A Solid-Pollymer Electrolyte direct methanol fuel cell with a mixed reactant and air anode Journal of Power sources 111 (2002) 43-51.
Shukla et al. Advances in Mixed-Reactant Fuel cells Fuel Cells 05, 2005, No. 4, 436-447.
Zheng et al. Selective membrane electrode assemblies for bipolar plate-free mixed-reactant fuel cells Journal of Power Sources 170 (2007) 286-290.

* cited by examiner

MIXED-REACTANT FUEL CELLS WITH SELECTIVE ELECTRODES

CROSS-REFERENCE TO RELATED APPLICATIONS

The following application claims benefit of U.S. Provisional Application No. 61/776,437, entitled "Mixed-Reactant Fuel Cells Utilizing Non-Carbon Fuels," filed Mar. 11, 2013, which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

In a conventional fuel cell, the fuel and oxidant flow in separate streams, kept apart by an ion conducting membrane that divides the cell into discreet anode and cathode chambers. The single-cells are stacked in series electric connection using bipolar flow field plates that provide most of the stack weight and volume. The membrane and bipolar plates contribute respectively 15-68% and 10-25% to the stack cost, depending on the intended application and stack design. By comparison, in a mixed reactant fuel cell (MRFC), a mixture of fuel and oxidant flows through the cell as a single stream. Although the mixed reactant concept is generally thought to flout reaction thermodynamics, it is possible to contrive a practical mixed-reactant system based on the following three kinetic effects: a) avoiding spontaneous thermochemical reaction between the fuel and oxidant that may occur in the bulk reactant mixture or on catalyst surfaces, b) providing intrinsic kinetic selectivity of the anode and/or cathode electrocatalysts to suppress mixed-potentials of electrodes; and c) promoting selectivity of the electrodes for mass transfer of the fuel and oxidant respectively to the anode and cathode. Previously described MRFCs have suffered from an inability to optimize these mechanisms, leading to thermochemical electrochemical, and/or mass transfer defects that lower the cell voltage, increase fuel consumption, and decrease the energy efficiency of the MRFC.

A specific example of a MRFC, is a direct borohydride-oxygen fuel cell (DBFC), which uses borohydride as a fuel. Borohydrides (such as $NaBH_4$) and their various derivatives are intensely researched for alternative energy related applications as either hydrogen storage compounds or as 'electrochemical fuels' including their use in fuel cells. In DBFCs, borohydride is supplied directly to the anode as an alkaline solution. Compared to other direct liquid fuel cells (i.e., methanol, ethanol, or formic acid), DBFCs possess two important advantages: i) higher theoretical energy density (9.3 kWh kg-1 of $NaBH_4$); and ii) the inherent absence of carbon in the fuel. The inherent absence of carbon implies that a DBFC can be operated as a zero carbon emission device. Furthermore, because the DBFC does not produce CO, a well-known intermediate formed during electro-oxidation of fuels such as methanol, ethanol and formic acid and is known to act as catalytic poison), alternative anode options are available.

With respect to the DBFC design, most of the published literature employs the conventional dual-chamber proton exchange membrane (PEM) technology in a single-cell configuration. While this set-up is adequate for laboratory scale catalyst research purposes, the plate-and-frame PEM fuel cell stack design, imported unchanged from the hydrogen-oxygen fuel cell research, poses several challenges for the scale-up and stack design of alkaline DBFC. Some of these challenges are: PEM durability in the concentrated alkaline electrolyte; need for both gas-tight and liquid-tight sealing; use of heavy and expensive bipolar flow-field plates that must withstand the concentrated alkaline solution; and need for fairly complex stack manifolds to assure uniform distribution of the alkaline borohydride solution to each anode in the stack with low pressure drop. There have been very few publications addressing any of these very important issues concerning the DBFC technology and its scale-up. Yang et al. replaced the PEM with a hydrophilic polymer and reported a single-cell power density of 663 mW cm-2 using a Co-based anode. See, e.g., X. Yang, Y. Liu, S. Li, X. Wei, L. Wang, Y. Chen, *Scientific reports* 2012, 2, 567, which is incorporated herein by reference.

From the point of view of oxygen electroreduction cathode catalyst, the alkaline electrolyte needed to stabilize $NaBH_4$ offers the possibility of using non-platinum cathode catalysts. It has been well-documented in the literature that the oxygen reduction reaction (ORR) in alkaline electrolytes is catalyzed by non-platinum group (non-PGM) catalysts as well such as Ag, $MnO2$ and various activated and doped carbon. The number of electrons exchanged in ORR per oxygen molecule is mainly dependent on the electrocatalyst and on the electrode potential and it varies between two and four. Carbon black electrodes in alkaline media catalyze only a two-electron transfer leading to $HO_2-$. However, for alkaline fuel cells, the four-electron pathway is more efficient and thus preferred. Among the platinum-free ORR electrocatalysts capable of catalyzing a four-electron transfer, catalysts formed from one or more transition metals, nitrogen, and carbon, (M-N—Cs), are attractive candidates due to their high surface area, high activity, and low cost. The conventional synthesis of M-N—C catalysts involves various precursor deposition steps onto the high surface area carbons, resulting in a catalyst formed from a combination of the active material with an inert carbon matrix. Unfortunately, the presence of the carbon matrix substantially decreases the density of active sites for the four-electron pathway, somewhat neutralizing the advantage gained by using an M-N—C catalyst.

Accordingly, while DBFCs appear to be promising avenues for cost-effective zero carbon emission energy production, several challenges must be addressed including both the design over the fuel cell itself and optimization of a catalyst for use in a DBFC.

Accordingly, while MRFCs, including, but not limited to, DBFCs have the capacity for lower capital costs and higher power densities, there are several design issues that must be addressed before they are a commercially viable energy alternative.

SUMMARY

In the present disclosure, a novel mixed reactant fuel cell (MRFC) including a MRFC-optimized electrocatalyst is provided. The described MRFC utilizes a selective electrode that is able to tolerate and catalyze mixed-reactant fuels. According to one embodiment, the selective electrode employs a catalyst that is selective for either the oxygen reduction reaction or oxidation, depending on whether the electrode is a cathode or anode. According to a further embodiment, the electrode includes a cathode comprising a self-supporting porous M-N—C catalyst that is selective for the ORR reaction and formed using a sacrificial-support based method. According to another embodiment, the electrode comprises a selective fluid distributor that helps to distribute liquid fuel to the anode and gas to the cathode. According a specific embodiment, the MRFC employs a Swiss-roll design incorporating a multi-layered sandwich of electrodes and separators rolled around an electrically conductive axis, wherein the cathode and anode layers are each selective to the intrinsic electrode kinetics of fuel oxidation and oxidant reduction, respectively.

DETAILED DESCRIPTION

Figure 1:
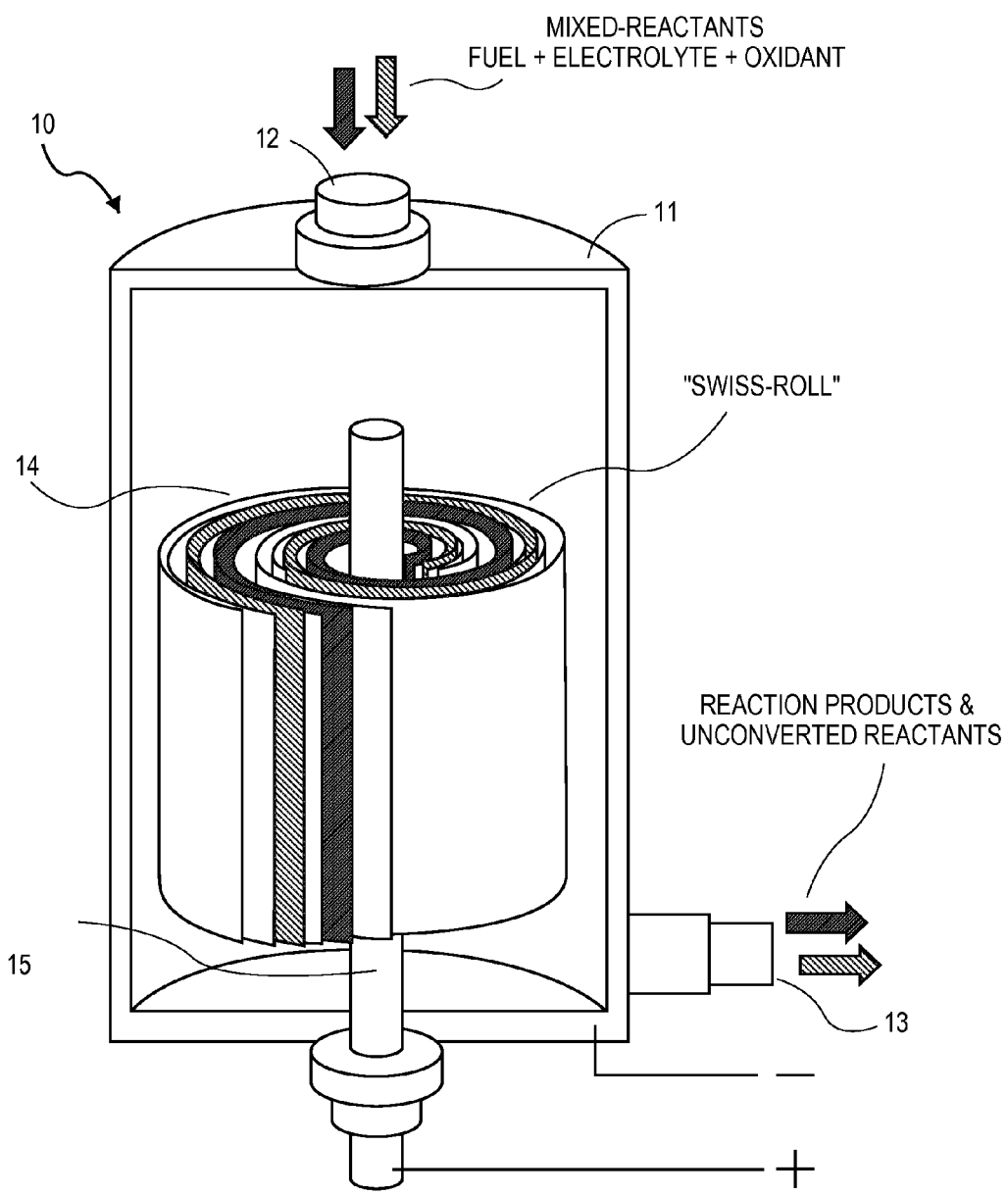
FIG. 1 is a schematic illustration of an exemplary MRFC of the present disclosure.

According to an embodiment, the present disclosure provides a novel mixed reactant fuel cell (MRFC) including a MRFC-optimized electrocatalyst. In general, the MRFC utilizes a selective electrode that is able selectively catalyze and/or selectively transport the different reactants in mixed-reactant fuels.

According to one embodiment of the present disclosure, the MRFC described herein employs either a selective cathode catalyst, a selective anode catalyst, or both. For the purposes of the present disclosure, the term "selective cathode catalyst" is a catalyst that, in the presence of a particular reactant (or a particular reactant in a reactant mixture), will selective catalyze electroreduction of the reactant. Ideally, the selective cathode catalyst is tolerant to electro- or chemical oxidation of fuel, can electroreduce the oxidant without mixed-potential losses, and will electroreduce utilizing a 4$e^-$ pathway. For example, an ideal selective cathode catalyst for use with borohydride fuel is one which would not chemically or electrochemically oxidize borohydride fuel and which catalyze the ORR pathway via the 4$e^-$ mechanism. Conversely, the term "selective anode catalyst" is a catalyst that, in the presence of a particular reactant (or a particular reactant in a reactant mixture), will selective catalyze oxidation of the reactant. Ideally, the selective anode catalyst is tolerant to electro- or chemical reduction of the oxidant and can electro-oxidize the fuel without mixed-potential losses.

Examples of selective catalyst include, but are not necessarily limited to: $EuO_2$, $MnO_2$, $La_2O_3$, $CeO_2$, Fe/CoPc, perovskite-type oxides (e.g., $LaNiO_3$, $LaCoO_3$), and M-N—C catalysts.

According to some embodiments, the "selective cathode catalyst" is a self-supporting porous metal-nitrogen-carbon (M-N—C) catalyst formed using a sacrificial support technique as described herein. As described in greater detail below, the self-supporting porous M-N—C catalysts described herein are able to act as selective cathode catalysts due both to the specific materials selected to form the catalyst, and to their specific morphology, which promotes proxomity between oxygen atoms in the reactant and active sites in the catalysts.

For the purposes of the present disclosure, the term "active site' is used to describe chemical species on the surface of the catalyst and/or active support that participate in the catalyzed reaction.

For the purposes of the present disclosure, the term "sacrificial support" is intended to refer to a material that is included during the synthesis process in order to provide temporary structure but which is mostly or entirely removed during the synthesis process. As described in greater detail below, according to various embodiments, the sacrificial support takes the form of a sacrificial particles (also referred to herein as "sacrificial support particles".)

According to various embodiments of the sacrificial support-based method, sacrificial support particles are mixed with M-N—C precursors, either in solution, or using mechanosynthesis means as described below, in order to coat, deposit, impregnate, infuse, or similarly associate the M-N—C precursors on or in the sacrificial support particles and at least initiate formation of the M-N—C product compound. For the sake of simplicity, unless otherwise specified, the term "coat" is used herein as a catchall phrase to refer to any type of physical association, whether or not the "coating" is complete or partial and whether exclusively external or both internal and external. The resulting mixture is dried, if necessary, subjected to heat treatment, and the sacrificial support removed, resulting in a porous, self-supported catalyst.

For the purposes of the present disclosure, the term "precursor" is used to refer to a compound which participates in a chemical reaction by contributing one or more atoms to a compound that is formed as the product of the chemical reaction or otherwise contributes to the formation of the product. For example in generating a gaseous product that creates a small pore or void in the final product or in helping create the chemical structure of the final product as in the case of nickel nanoparticles leading to the growth of carbon fibers.

It will be appreciated that the present disclosure often makes reference to "M-N—C precursors." It should be understood that such terminology is used to refer to any single or group of precursors which, taken as a whole, contain suitable metal, nitrogen, and carbon atoms which are available for chemical synthesis. Accordingly, an "M-N—C precursor" may refer to a metal-nitrogen-and-carbon-containing precursor; or to a metal-containing precursor and a nitrogen-and-carbon-containing precursor; or a metal-and-nitrogen-containing precursor and a carbon-containing precursor; or a metal-and-carbon-containing precursor and a nitrogen-containing precursor; or a metal-containing precursor, a nitrogen-containing precursor, and carbon-containing precursor, so long as the metal, nitrogen, and carbon, are available for chemical synthesis. Accordingly, while the M-N—C precursors referred to herein are most commonly a combination of a metal precursor (such as a metal salt) and precursors of a nitrogen-and-carbon containing compound, it should be understood that other precursor combinations are possible and contemplated by the present disclosure.

According to various embodiments, the metal may be a transitional metal. Suitable transition metals include, but are not limited to, Fe, Ce, Cr, Cu Mo, Ni, Ru, Ta, Ti, V, W, and Zr. Exemplary transition metal precursors include, but are not limited to iron nitrate, iron sulfate, iron acetate, iron chloride, cerium nitrate, chromium nitrate, copper nitrate, ammonium molybdate, nickel nitrate, ruthenium chloride, tantalum isopropoxide, titanium ethoxide, vanadium sulfate, ammonium tunstanate and zirconium nitrate. Furthermore, according to some embodiments the presently described methodologies may utilize precursors of two or more metals to produce multi-metallic catalysts.

Exemplary characteristics which may be examined with regard to the selection of nitrogen, carbon, or nitrogen-carbon precursors used for producing catalytic materials as described herein include, but are not limited to the selectivity of the resulting catalyst for reduction of the selected fuel cell reactants and: (1) carbon richness; (2) nitrogen richness; and (3) thermal stability, i.e. the volatility of the molecules and resistance to decomposition due to heating. The degree of carbon richness is related to the porosity of the final product. For example, according to some embodiments, a porous, open-frame matrix will be formed if each molecule of the carbon precursor contains, on average, at least 5 carbon atoms. Depending on whether the plan is to perform synthesis in an inert or nitrogen-rich environment, the nitrogen richness of the precursor may need to be taken into account. For example, if synthesis is to be performed in an inert atmosphere, the precursor must have a substantial amount of nitrogen, since all the M-$N_x$ centers must be formed from nitrogen contained in the precursor itself. Finally, precursors should be chosen which will remain stable under the thermal conditions to be used. For example, if the methodology to be used requires pyrolysis at a temperature of above 700° C. (a minimum temperature frequently required for active-site formation), it is important that the precursor remain stable at temperatures above 700° C.

According to various embodiments, the nitrogen and carbon containing compound may be aminoantipyrine (AApyr) and thus the precursors may be precursors of AApyr. According to a specific embodiments, catalysts formed as described herein using AApyr may be selected as a catalyst for ORR in MRFCs utilizing borohydride fuels. Other suitable nitrogen and carbon containing compounds include, but are not limited to any nitrogen-carbon containing organic molecules.

According to some embodiments, the M-N—C precursors and sacrificial support particles may be mixed together under aqueous conditions using known solvents such as water, alcohols, or the like and using various known mechanical mixing or stirring means under suitable temperature, atmospheric, or other conditions as needed in order to enable or initiate polymerization. Suitable mixing means include, for example, use of an ultrasound bath, which also enables dispersion of the sacrificial support particles.

According to other embodiments the M-N—C precursors and sacrificial support particles may be mixed together using mechanosynthesis techniques such as ball-milling, which do not necessarily require solvents. Ball-milling has been described previously in referenced to M-N—C catalyst material synthesis as a method for filling the pores of a carbon support with a pore-filler. However, in the methods described in the present disclosure, ball-milling is used to enable mechanosynthesis, alleviating the need for solvent-based preparation methods. In general, the presently described methods utilize the energy produced by ball-milling of the various precursor materials to drive a chemical reaction between the precursors. According to a more specific example, a catalytic material according to the present disclosure may be synthesized by ball milling the sacrificial support and M-N—C precursors under sufficient conditions to initiate a reaction between the various precursors, thereby forming (or initiating formation of) an M-N—C compound.

For the purposes of the present disclosure, the term "ball mill" is used to refer to any type of grinder or mill that uses a grinding media such as silica abrasive or edged parts such as burrs to grind materials into fine powders and/or introduce to the system enough energy to start a solid state chemical reaction that leads to the formation of a catalyst. In general, for the purposes of the present disclosure, the ball mill used should be capable of producing enough energy to initiate the desired chemical reaction or achieve the desired level of mixing.

According to some embodiments, the entire process is performed dry, by which is meant, without the presence of any added solvents. According to one embodiment of a solvent-free process, all initial materials (i.e. the M-N—C precursors and sacrificial support particles) are combined in a ball mill in powder form and the entire process is conducted without the addition of any liquids. For the purposes of the present disclosure, a powder is a dry, bulk solid composed of a large number of very fine particles that may flow freely when shaken or tilted. Because the method can be practiced without the presence of any solvents, the method enables the synthesis of supports formed from insoluble materials. Of course it will be appreciated that while the mechanosynthesis method does not require the addition of solvents, solvents may be used, if desired.

It should be appreciated that the presently disclosed methods enable the production of catalysts having highly controllable morphology. Specifically, by selecting the ratio of sacrificial support particles to M-N—C precursor materials and the size, shape, and even porosity of the sacrificial template particles, it is possible to both control, select, and fine-tune the internal structure of the catalyst. In essence, the disclosed method enables the production of a catalyst having as convoluted and tortuous an internal structure as desired. For example, a highly porous open-structure "sponge-like" catalyst may be formed by using larger sacrificial template particles, while a highly convoluted, complex internal structure may be formed by using smaller, more complexly shaped, sacrificial particles, including for example, sacrificial particles of different shapes and/or sacrificial particles which are themselves porous. Moreover, the "density" of the catalyst can be selected by altering, for example, the ratio of sacrificial particles to M-N—C precursor materials, the shape of the template particles (i.e. how easily they fit together), or other factors.

Accordingly, it will be appreciated that the size and shape of the sacrificial support particles may be selected according to the desired shape(s) and size(s) of the voids within the final catalyst product. Specifically, it will be understood that by selecting the particular size and shape of the support particles, one can produce an electrocatalyst having voids of a predictable size and shape. For example, if the template particles are spheres, the catalyst will contain a plurality of spherical voids having the same general size as the spherical particles. For instance, assuming there is no alteration in the size of the particle caused by the synthesis method, in an embodiment where particles having an average diameter of 20 nm is used, the spherical voids in the catalyst will typically have an average diameter of approximately 20 nm (Those of skill in the art will understand that if the diameter of the particle is 20 nm, the internal diameter of the void in which the particle resided will likely be just slightly larger than 20 nm and thus the term "approximately" is used to account for this slight adjustment.)

Accordingly it will be understood that the sacrificial support particles may take the form of any two- or three-dimensional regular, irregular, or amorphous shape or shapes, including, but not limited to, spheres, cubes, cylinders, cones, etc. Furthermore, the particles may be monodisperse, or irregularly sized.

It will be further understood that because the catalysts are formed using a sacrificial support technique, where the sacrificial material can be, for example, "melted" out of the supporting materials using acid etching or other techniques, the resulting catalysts can be designed to have a variety of variously shaped internal voids which result in an extremely high internal surface area that is easily accessible by gasses in the fuel cell. Furthermore, because the size and shape of the voids is created by the size and shape of the sacrificial particles, catalysts having irregular and non-uniform voids can easily be obtained, simply by using differently shaped sacrificial particles and/or by the non-uniform distribution of sacrificial materials within the M-N—C precursor/sacrificial particle mixture. Furthermore, the sacrificial-support based methods of the present disclosure may produce catalysts having, for example, a bi-modal (or even multi-modal) pore distribution either due to the use of differently sized sacrificial particles or where a first smaller pore size is the result of removal of individual particles and thus determined by the size of the sacrificial particles themselves and a second, larger, pore size is the result of removal of agglomerated or aggregated particles. Accordingly, it will be understood that the method described herein inherently produces a catalyst having a unique morphology that would be difficult, if not impossible, to replicate using any other technique.

Figure 2:
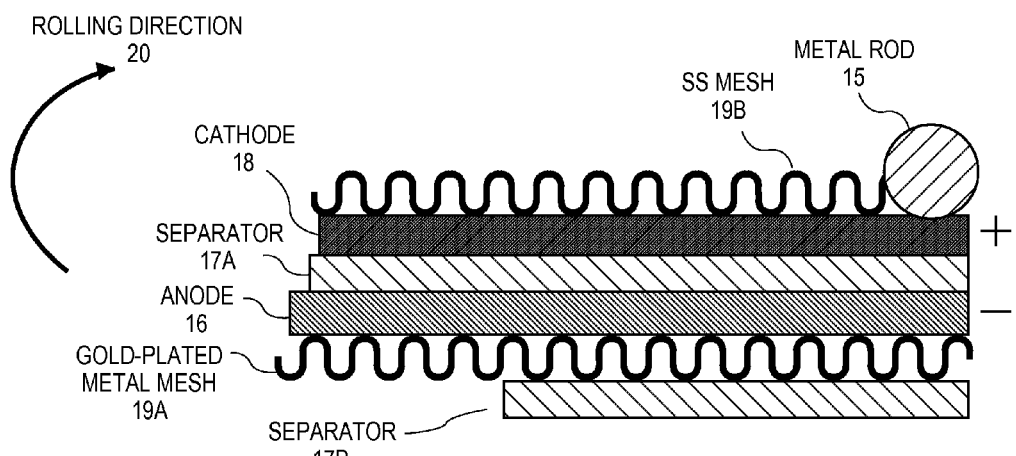
FIG. 2 is a schematic illustration of the various layers that form the Swiss roll electrode in the MRFC of FIG. 1.

As stated above, according to various embodiments, sacrificial particles of any size or diameter may be used. In some preferred embodiments, sacrificial particles having a characteristic length/diameter/or other dimension of between 1 nm and 100 nm may be used, in more preferred embodiments, sacrificial particles having characteristic length/diameter/or other dimension of between 100 nm and 1000 nm may be used and in other preferred embodiments, sacrificial particles having characteristic length/diameter/or other dimension of between 1 mm and 10 mm may be used. It should also be understood that the term "sacrificial particle" is used herein as a term of convenience and that no specific shape or size range is inherently implied by the term "particle" in this context. Thus while the sacrificial particles may be within the nanometers sized range, the use of larger or smaller particles is also contemplated by the present disclosure. According to one specific embodiments, and as described in greater detail below, catalysts formed from Fe-AAPyr having a bi-modal pore distribution where the pores were found to fall primarily in the 40-60 nm size range and in the ~200 nm size range were found to act as excellent catalysts for a DBFC designed as shown in FIGS. 1 and 2.

According to some embodiments, the sacrificial particles may themselves be porous. Such pores may be regularly or irregularly sized and/or shaped. The use of porous sacrificial particles enables the M-N—C precursors to intercalate the pores, producing even more complexity in the overall three-dimensional structure of the resulting catalyst.

It will be appreciated that the sacrificial template particles may be synthesized and mixed (or coated, or infused, etc.) in a single synthesis step or the metal salts may be mixed with pre-synthesized (whether commercially purchased or previously synthesized) sacrificial particles.

Of course it will be appreciated that given the various conditions that the sacrificial template will be subjected to during the synthesis process, it is important to select a template material which is non-reactive to the catalytic materials under the specific synthesis conditions used and the removal of which will not damage the final material. For example, if the supporting is to be an active support, it is important that the method(s) used to remove the sacrificial particles not damage the support's active sites. Silica is a material which is known to easily withstand the conditions described herein while remaining inert to a variety of catalytic materials including the metals described herein. Furthermore, silica can be removed using techniques that are harmless to the support's active sites. Thus, silica is considered to be a suitable material from which the sacrificial template particles can be made. According to some specific embodiments, 20 nm diameter spheres formed from mesoporous silica can be used. In this case the templating involves intercalating the mesopores of the silica template particles and the resulting material typically contains pores in the 2-20 nm range. In one particular embodiment, the silica template is commercially available Cabosil amorphous fumed silica (325 $m^2$/g). Those of skill in the art will be familiar with a variety of silica particles that are commercially available, and such particles may be used. Alternatively, known methods of forming silica particles may be employed in order to obtain particles of the desired shape and/or size.

However, while many of the examples herein utilize silica for the templating materials, it will be appreciated that other suitable materials may be used including, but are not limited to, zeolites, aluminas, and the like.

After the M-N—C precursor are mixed with the sacrificial support, to produce an M-N—C compound-sacrificial support mixture, the resulting material is heat treated. Heat treatment may be performed either in an inert atmosphere such as $N_2$, Ar, or He, or in a reactive atmosphere such as $NH_3$ or acetonitrile. Inert atmospheres are typically used when the M-N—C materials are nitrogen rich, as the inert atmosphere enables the production of a high number of active sites with Fe (or other metal) $N_4$ centers. However, it may be desired to use a nitrogen rich atmosphere if the M-N—C material is rich in carbon and depleted in nitrogen, as the nitrogen rich atmosphere will enable production of the Fe (or other metal) $N_4$ centers.

According to some embodiments, particularly embodiments wherein a single step synthesis method is used, optimal temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred, as our experimental data showed this temperature to produce catalysts having a high amount of catalytic activity for certain specific materials (see experimental section below).

After heat treatment, the sacrificial template particles are removed resulting in a porous, M-N—C catalyst. In some cases the catalyst consists only of materials derived from the M-N—C precursors. Removal of the sacrificial template particles may be achieved using any suitable means. For example, the template particles may be removed via chemical etching. Examples of suitable etchants include NaOH, KOH, and HF. According to some embodiments, it may be preferable to use KOH, as it preserves all metal and metal oxide in the material and, use of KOH may, in fact, increase catalytic activity of the active centers. Alternatively, in some embodiments, HF may be preferred as it is very aggressive and can be used to remove some poisonous species from the surface of the support. Accordingly, those of skill in the art will be able to select the desired etchants based on the particular requirements of the supporting material being formed.

As stated above, the presently described catalytic materials can also be synthesized using a two-step procedure. In this procedure, the M-N—C precursors are mixed with the sacrificial support as described above, and the resulting M-N—C compound/sacrificial support mixture is then subjected to a first heat treatment step, such as pyrolysis, in order to produce an intermediate material that is rich with an unreacted metal, such as iron. The intermediate material is then subjected to a second heat treatment step, which may be, for example, a second pyrolysis treatment, resulting in newly formed active sites. After the second heat treatment, the sacrificial support is removed using chemical etching or other suitable means as described above.

In embodiments utilizing a two-step procedure, and therefore, two separate heat treatment steps, it may desirable for the different heat treatment steps to be conducted under different conditions, for example at different temperatures and/or for different durations of time. For example, the first heat treatment step may be performed at a higher temperature, such as 800° C. for 1 hour and the second heat treatment step may be performed at a temperature between 800 and 1000° C. for a period of time between 10 minutes and 1 hour.

After the sacrificial support is removed, the catalyst may be further processed to prepare the catalyst to be deposited, painted, layered, attached, inserted, or otherwise associated with a supporting material. For example, the catalyst could be ground or ball-milled, if necessary, to obtain a powder having a desired particle size. Moreover, the catalyst could be mixed with a carbon black such as Vulcan XC-72 (Cabot, Corporation, Billerica, Mass.) and an ionomer such as Nafion (E.I. du Pont de Nemours and Company, Buffalo, N.Y.) to form an ink which can then be sprayed or otherwise deposited onto a surface. The catalyst, carbon black, and ionomer can be mixed together in any suitable ratio. However, as explained in greater detail in the Examples section below, carbon black at a ratio of between 5 and 50 wt % and an ionomer of between 10 and 70 wt % obtained favorable results, with an optimal ratio being approximately 42% carbon black and 30 wt % ionomer with a Fe-AApyr catalyst loading at 6 mg $cm^{-2}$.

As stated above, accordingly to some embodiments, the presently described system is able to receive a mixed reactant fuel comprised of both liquid fuel and gaseous oxygen (or another oxidase such as hydrogen peroxide) and deliver these reactants to the appropriate catalysts without necessarily requiring prior separation of the reactants or the use of an ion exchange membrane within the fuel cell. According to these embodiments, the system may utilize one or more selective fuel distributors. For the purpose of the present disclosure, the term "selective fuel distributor" refers to a mechanism which, when exposed to a mixed reactant fuel, transports, or enables the transport, of one type of reactant and/or bars or limits or discourages transport of another type of reactant. For example, a particular selective anode fuel distributor may enable delivery of liquid fuel to the anode while barring, limiting, or otherwise discouraging access of oxygen gas to the anode. Conversely, a particular selective cathode fuel distributor may enable delivery of the gaseous oxidant to the cathode while barring or limiting or otherwise discouraging access of liquid fuel to the cathode. It will be understood that the selective fuel distributors may rely on passive and/or active means for delivering one particular reactant and limiting another. For example, a selective anode fuel distributor may incorporate a hydrophilic surface while a selective cathode fuel distributor may incorporate a hydrophobic surface. Alternatively or additionally, the selective fuel distributors may incorporate pores, matrices or other physical structures or features that are designed to encourage or favor transport of one reactant over another.

According to various embodiments, selective fuel distributors may be formed from a material having or altered to have the desirable properties, such as the pores, matrices, or other structures identified above. The selective fuel distributors may be formed from any desirable material having any desirable structural shape or feature. For example, a selective fuel distributor may be or incorporate an inflexible insert or structure. Alternatively, the selective fuel distributor may be formed from or incorporate a flexible material such as cloth or fabric, Such a cloth may be knitted, woven, press-molded, extruded, etc. The selective fuel distributor may be formed from or incorporate carbon, carbon fiber, metal, or combinations thereof. In some cases one or more of the materials used to form a selective fuel distributor may have properties that contribute to the ability to act as a selective fuel distributor. Alternatively or additionally, the fuel distributor may have a coating that provides one or more properties that contribute to the ability to act as a selective fuel distributor. As specific non-limiting examples, a selective cathode fuel distributor may include a woven carbon cloth coated with PTFE, while a selective anode fuel distributor may include a metal mesh that has been gold plated.

According to some embodiments, a MRFC according to the present disclosure may include a selective matrix formed from the combination of a selective fuel distributor and a selective catalyst. In this case, some or all of the selective fuel distributor may act as a substrate for the catalyst material. For example, a selective cathode matrix may be formed by distributing a selective cathode catalysts onto the surface of a selective cathode fuel distributor. As a more specific example, in some embodiments, a selective cathode matrix may be formed by distributing a selective cathode catalyst on the surface of a substrate with gas diffusion properties.

For the purposes of the present disclosure, the terms "substrate" or "substrate material" is used to describe a physical structure on which a chemical or compound, such as a catalyst, is or can be situated in order to form an electrode. Accordingly, a substrate may take any form, shape or shapes that are useful for the desired product, including, but not limited to flexible or inflexible sheets, cloths, bricks, three-dimensional structures, etc. Furthermore, the substrate may consist of a single, monolithic piece or comprise multiple pieces, including, but not limited to fibers, strings, or particles that are woven, molded, adhered or otherwise formed together to form the substrate. According to various embodiments described herein, the substrate may be carbon-based, but other materials including conductive matrixes of nitrides, oxides, and carbides may be included or used instead.

A specific non-limiting embodiment of an MRFC incorporating selective electrodes formed from selective catalysts and selective fuel distributors is shown in FIGS. 1 and 2. The depicted MRFC utilizes a Swiss-roll design incorporating a multi-layered sandwich of electrodes and separators rolled around an electrically conductive axis, wherein the anode and cathode layers are each selective to the intrinsic electrode kinetics of fuel oxidation and oxidant reduction, respectively. It will be understood that the depicted embodiment is shown and described as just one example of an MRFC incorporating the selective catalysts and selective fuel distributors described herein, and that numerous other configurations are possible including configurations employing more traditional electrode arrangements incorporating ion-exchange mechanisms and electrolytic fluids, configurations employing only selective catalysts and selective electrodes for either the anode or cathode side, and/or configurations employing only selective anode catalysts or only selective cathode catalysts, and various combinations and alternative configurations. Furthermore, while the specific example in the Examples section below is directed to a Swiss-roll design and the utilization of a borohydride fuel, it will be understood that the selective electrodes described herein can be used for any mixed reactant fuel cell utilizing any suitable fuel including, but not limited to, formate salts, formic acid, methanol, borohydride salts, ammonia, hydrazine, hydroxylamine salts, ethanol, ethylene glycol, methyl formate, and dimethyl ether.

Turning to FIG. 1, a conceptual view of an exemplary MRFC of the present disclosure is seen. As shown, the MRFC 10 includes a body 11 having an inlet 12 for introducing reactants, such as fuel and oxidant into the fuel cell and an outlet 13, which expels reaction products and unconverted reactants. Within the body is housed a "Swiss-roll" or electrode stack 14 formed from a multi-layered sandwich of electrodes and separators rolled around an electrically conductive axis 15 and in physical communication with the inner surface of the housing.

Turning to FIG. 2, which depicts an "unrolled" stack, it can be seen that the stack includes at least five different layers: an anode 16, separators 17a and b, cathode 18, and first and second current collectors 19a and b, respectively. As shown, while in use the stack is wrapped around the electrically conductive axis 15 in the direction shown by arrow 20 so that the cathode layer is initially wrapped closest to the conductive axis. The outer separator layer 17b maintains separation between the anode and cathode layers when the stack makes a second foray around the axis. It will be appreciated, that while not depicted, a MRFC as described herein need not be limited to a single cell, and therefore may incorporate more than one electrode stack, resulting in a bipolar series stack of fuel cell.

Referring again to FIG. 2, in the depicted embodiment, anode 16 incorporates a catalyst that is selective for fuel oxidation dispersed on a substrate. According to some embodiments the supporting material may have dimensions which according to common nomenclature categorize the anode as three-dimensional, by which is meant having a thickness greater than 10 nm. Those of skill in the art will understand that the substrate and oxidative catalytic material used should be suitable for the fuel to be used in the MRFC. According to some embodiments, including those where the fuel is borohydride, the substrate may take the form, for example, of an unteflonated woven carbon cloth which may be optionally pretreated to provide mass transfer selectivity for the electrode. A suitable pretreatment would be, for example, pretreatment in nitric acid. The oxidative catalytic material may take the form of synthesized or commercially available Pt/Vulcan XC-72(50%, E-TEK) mixed with 30 wt. % Nafion®. Other suitable ORR-selective materials include, but are not limited to, osmium, nickel, cobalt, cobalt oxide, gold, silver, perovskites, transitional metals oxidized and alloys thereof.

Separators 17a and b provide physical separation between the anode 16 and the cathode 18 and may be formed from, for example, commercially available hydrophilic polypropylene. Other suitable materials include polymeric membranes such as Nafion®, plastic meshes and porous diaphragms. Depending on the materials used, separators 17a and b may have a thickness between 10 and 500 μm, though those of skill in the art will understand that the thickness can be variable and selected to optimize the design based on the particular materials and reactants being used in the MRFC.

The gas-diffusion electrode cathode 18 comprises a catalyst that is selective for the oxygen reduction reaction (ORR) dispersed on a substrate. As with the anode catalyst, those of skill in the art will understand that the substrate and ORR-selective catalyst should be suitable for use with the fuel being used in the MRFC. According to some embodiments, including those where the MRFC is a DBFC, the supporting material may take the form of, for example PTFE-treated woven carbon cloth and/or the catalyst may be a non-platinum group metal (non-PGM) catalyst. In some embodiments the non-PGM catalyst may be a transition metal-nitrogen-carbon (M-N—C) catalyst and in still further embodiments the M-N—C catalyst may be a self-supported porous catalyst formed using a sacrificial support-based method as described above.

In the embodiment shown in FIG. 2, self-supporting porous catalysts prepared as described above are sprayed onto a PTFE-treated woven carbon cloth. Suitable methods for spraying the ink include, but are not limited to a controlled moving table, and robotic spraying systems.

Still referring to FIG. 2, according to the depicted embodiment, the MRFC disclosed herein does not require any of the conventional flow-field plates that are common in the fuel cell industry for feeding and distributing the reactants to the electrodes. Instead, porous fluid distributors 19a and b are used with different hydrophobicities for the anode and cathode, respectively. According to various embodiments, porous fluid distributor 19a, which is positioned next to the anode may be formed from a hydrophilic porous material such as gold plated metal mesh. According to various embodiments, porous fluid distributor 19b, which is positioned next to the cathode may be formed from a hydrophobic porous material such as a stainless steel mesh. The difference in hydrophobicites of the fluid distributors helps to direct liquid fuels toward the anode and away from the cathode.

In use, a mixed reactant containing fuel and an oxidant, such as borohydride oxygen is introduced into the fuel cell as a single stream (mixed-together) via the inlet and immediately encounters the electrodes. Aqueous fuel is drawn to the anode via the hydrophilic nature of the hydrophilic fluid distribution layer and anode substrate that is adjacent to the anode layer and pushed away from the cathode due to the hydrophobic nature of the hydrophobic fluid distribution layer that lies adjacent to the cathode. The gas diffusion portion of the cathode may also be designed to by hydrophobic, also helping to maintain this separation. In contrast, movement of the gaseous oxygen towards the cathode is added by the hydrophobic nature of the fluid distributor and cathode substrate that lies adjacent to the cathode and the gas diffusion layer that forms part of the cathode layer. Once the oxygen reaches the cathode, the porous nature, high surface area, and distribution of active sites in the self-supporting porous catalyst result in a substantially more efficient ORR, aiding the overall performance of the fuel cell.

As explained in greater detail in the Examples section below, a MRFC designed and operated as described herein was able to obtain an extremely high open circuit voltage (OCV) of 0.97V, which is very high for any type of fuel cell and extremely compared to previously described MRFC systems, which typically have an OCV in the range of 0.3-0.86. In general, the mechanisms described herein easily enable the production of a MRFC with an OCV of higher than 0.90, higher than 0.95 and even as high as 0.97.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the Examples section below.

EXAMPLES

I. Preparation of MRFC Containing Porous Fe-AAPyr Selective Cathode Catalyst

Catalyst Preparation

Fe-Aminoantipyrine (Fe-AAPyr) catalyst was prepared as follows. First, a calculated amount of silica (Cab-O-Sil™ M5, surface area: ~200 $m^2$ $g^{-1}$) was dispersed in water using the ultrasound bath. Then, a solution of aminoantipyrine in acetone was added to silica, and sonicated for 20 minutes. Then, an aqueous solution of iron nitrate ($Fe(NO_3)_3 \cdot 9H_2O$) (Sigma-Aldrich) was added to the $SiO_2$-AAPyr solution (the total metal loading on silica was calculated to be ~25 wt. %), and sonicated for 2 hours in the ultrasound bath. After ultrasound treatment, a viscous solution of silica and Fe-AAPyr was dried overnight at 85° C. The solid was ground to a fine powder in an agate mortar, and then subjected to the heat treatment (HT). The general conditions of HT were: UHP $N_2$ atmosphere flowing at a rate of 100 mL $min^{-1}$, HT temperatures of 950° C. and HT durations of 30 minutes. Finally, the silica was leached out by means of excess amount of 35 wt. % of HF for 24 hours and resulting powder was washed with DI water until neutral reaction.

Characterization Scanning electron microscopy was performed on a Hitachi S-800 instrument. X-ray photoelectron (XPS) spectra were acquired on a Kratos Axis Ultra DLD X-ray photoelectron spectrometer using a Al Kα source monochromatic operating at 150 W with no charge compensation. The base pressure was about $2 \times 10^{-10}$ torr, and operating pressure was around $2 \times 10^{-9}$ torr. Survey and high-resolution spectra were acquired at pass energies of 80 eV and 20 eV, respectively. Acquisition time for survey spectra was 2 minutes, for C1s and O1s spectra—5 minutes, for N 1s and Fe 2p—30 minutes. Data analysis and quantification were performed using CasaXPS software. A linear background subtraction was used for quantification of C1s, O1s and N1s spectra, while a Shirley background was applied to Fe 2p spectra. Sensitivity factors provided by the manufacturer were utilized. A 70% Gaussian/30% Lorentzian line shape was utilized in the curve-fit of N 1s.

Rotating Ring Disk Electrode (RRDE) Electrochemical analysis for the synthesized catalysts was performed using the Pine Instrument Company electrochemical analysis system. The rotational speed reported was 1200 RPM, with a scan rate of 5 mV sec$^{-1}$ for oxygen reduction reaction (1M KOH), and 1600 RPM with scan rate of 20 mV sec$^{-1}$ for NaBH$_4$ electrooxidation (0.5M NaBH$_4$ in 2M NaOH). A platinum wire counter electrode and an Hg/HgO reference electrode were used.

The working electrodes were prepared by mixing 5 mg of the Fe-AAPyr electrocatalyst with 850 μL of isopropyl alcohol and 150 μL of Nafion® (0.5% wt., DuPont). The mixture was sonicated before different amounts of ink were applied onto a glassy carbon disk with a sectional area of 0.2474 cm$^2$ to achieve loadings of 0.1, 0.2, 0.4 and 0.6 mg cm$^{-2}$. The efficiency of ring electrode was 37%.

Calculation of the number of electrons transferred per catalytic event was performed using the following equation, and assumes a theoretical maximum of 4 electrons per event:

$$n = 4 \frac{I_D}{I_D + \frac{I_R}{N}} \quad (1)$$

where n is number of electrons, $I_R$, $I_D$ and N are the ring current, disk current and ring collection efficiency (0.37), respectively.

The Swiss-roll MRFC design and components
Cathode Gas-diffusion Electrode (GDE)

An ink made of Fe-AAPyr electrocatalyst mixed with Vulcan XC-72 and 30 wt. % Nafion® (from a 5 wt. % Nafion® solution, Sigma Aldrich) was sprayed with an air sprayer gun onto a 2 cm×10 cm (20 cm$^2$ geometric area) 40% wt. PTFE-treated woven carbon cloth using a controlled moving table. The loading of the Fe-AAPyr electrocatalyst was 6 mg cm$^{-2}$. FIG. 2 presents SEM images of the cathode GDE.

Anode

An ink made of Pt/Vulcan XC-72 (50%, E-TEK) catalyst mixed with 30 wt. % Nafion® was sprayed onto a 2 cm×10 cm (20 cm$^2$ geometric area) un-teflonated woven carbon cloth (ElectroChem, Inc., uncompressed thickness of 380 μm). The anode Pt loading was 0.8 mg cm$^{-2}$. Based on thickness, this type of electrode is commonly referred to as three-dimensional (3D) electrode. Prior to spraying of the Pt catalyst, the carbon cloth substrates were pretreated in nitric acid (1M) at 90° C. for 1 h. The substrates were then thoroughly rinsed with 18 MW deionized water and air-dried at 60° C. in an oven for 2 h.

Separator

As separator between the anode and cathode, one layer of a hydrophilic polypropylene diaphragm (Vildeon® FS2227E, Freudenberg Nonwovens with thickness of 215 μm) was employed.

Fluid Distributors

Porous fluid distributors are used with different hydrophobicity for the anode and cathode, respectively. On the anode side, a gold plated 304 stainless steel (SS) screen (Screen Technology Group Inc., 40 Mesh, 0.0085" mill, 4 nm gold-plated) was used with matching size of the anode electrode (2 cm×10 cm). On the cathode side a 316L expanded SS mesh (Dexmet Corp., S67800/4SS(316L)23-284DBA). The expanded mesh has wider perforations and is expected to have higher gas hold-up due to capillary effect.

The Swiss-roll Reactor and Fuel Cell Tests

A sandwich of the above components was rolled around a 9.5 mm diameter stainless steel rod acting as current feeder, which was in electronic contact only with the cathode GDE. At the outer end of the roll the outmost exposed anode layer made a tight press fit when slid inside a 25 mm inner diameter gold-plated stainless steel cylinder, 10 cm long, serving as the Swiss-roll fuel cell container and anode current collector. Flow rates for the analyte (0.5 M NaBH$_4$+2 M NaOH) and oxidant (O$_2$) were 12 mL min$^{-1}$ and 10 SLPM, respectively. The reactor zone pressure was 105 kPa(abs). The temperatures used during fuel cell performance testing were 323 K. The fuel cell experiments were conducted using the Fideris MTK test station.

Results and Discussion

Figure 3:
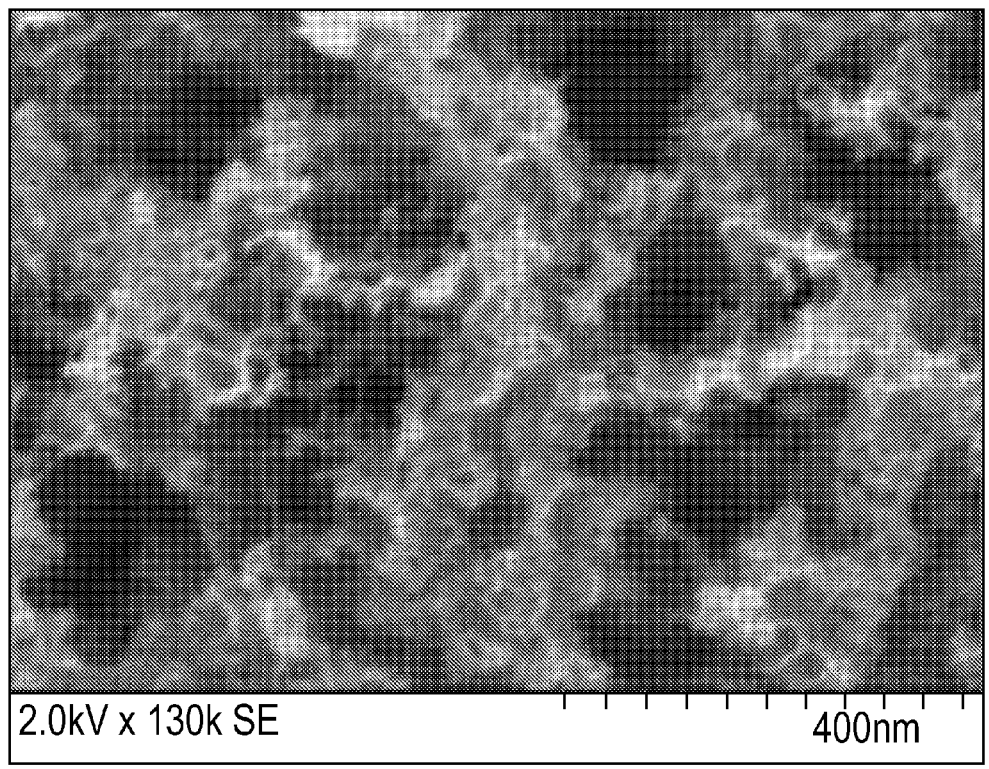
FIG. 3 is an SEM image of Fe-AAPyr catalyst pyrolyzed at 900° C. for 30 min.
Figure 4:
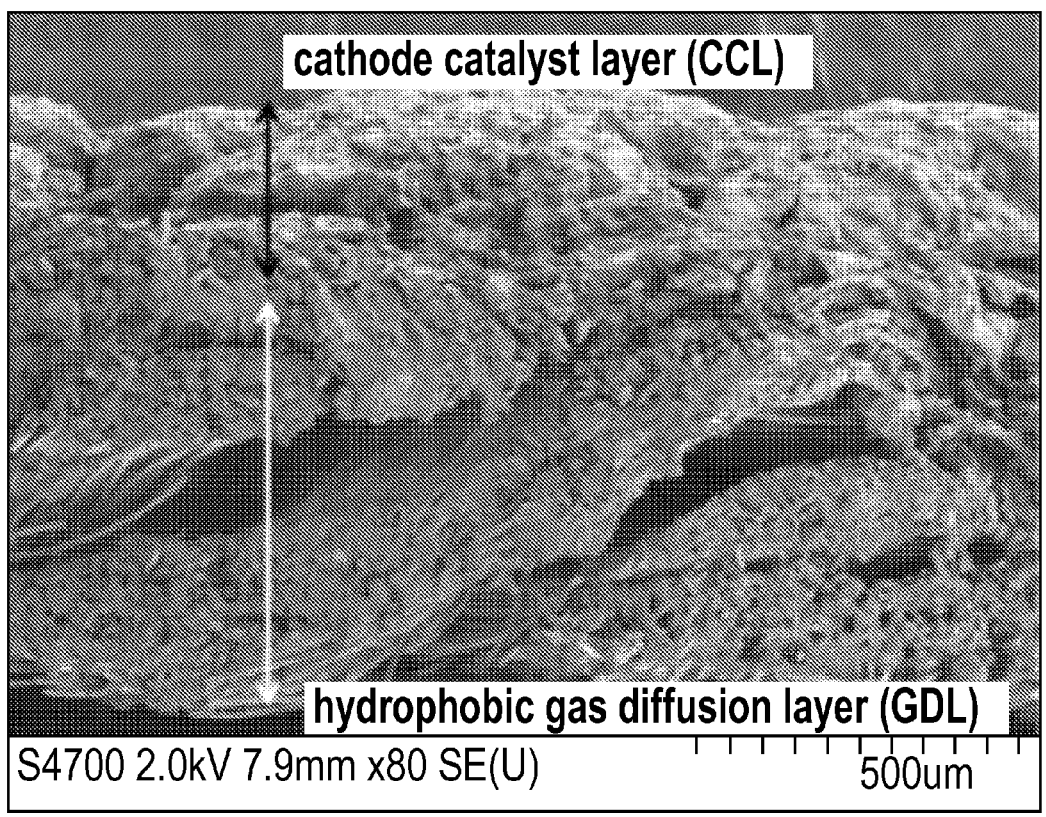
FIG. 4 is an SEM image of a cross section of a cathode gas diffusion electrode.

When used in other types of fuel cells, previously described self-supporting porous catalysts have typically required a pore sizes of 30-60 nm for best accessibility of the active sites by oxygen and effective water removal. To be used in mixed-reactant fuel cells, however, the catalyst had to be designed to be able to both supply oxygen to the active sites and, at the same time, resist flooding by the NaBH$_4$—NaOH electrolyte. Accordingly, catalysts having these abilities were synthesized by using a silica support having a surface area of 200 m$_2$g$^{-1}$ resulting in a total metal loading on the silica of ~25%. This resulted in catalyst with a surface area of 570 m$^2$ g$^{-1}$. Analysis of the Fe-AAPyr catalyst morphology by SEM (FIGS. 3 and 4) revealed that the catalyst had several types of pores, with one set of pores clustered in the 40-60 nm size range and another clustered in the ~200 nm size range. The larger pores could be beneficial because they are less susceptible to both flooding by the electrolyte and clogging by carbonate formation in the alkaline electrolyte exposed to air. FIG. 4, which is a cross-sectional view of the cathode gas diffusion layer incorporating the Fe-AAPyr catalyst shows the dual layer structure of the cathode GDE including the cathode catalyst layer (CCL) formed from the sprayed on FE-AAPyr-containing ink and the gas diffusion layer (GDL), formed from 40 wt. % PTFE-treated carbon cloth. The establishment of an efficient triple-phase boundary in the cathode GDE while avoiding flooding is essential for the operation of the gas-liquid mixed-reactant fuel cell. The composition of the CCL was varied as follows: Fe-AAPyr between 100% wt. and 10% wt., Vulcan XC-72 between 0 and 60% wt., and Nafion® 0 and 30 wt. %.

Figure 5:
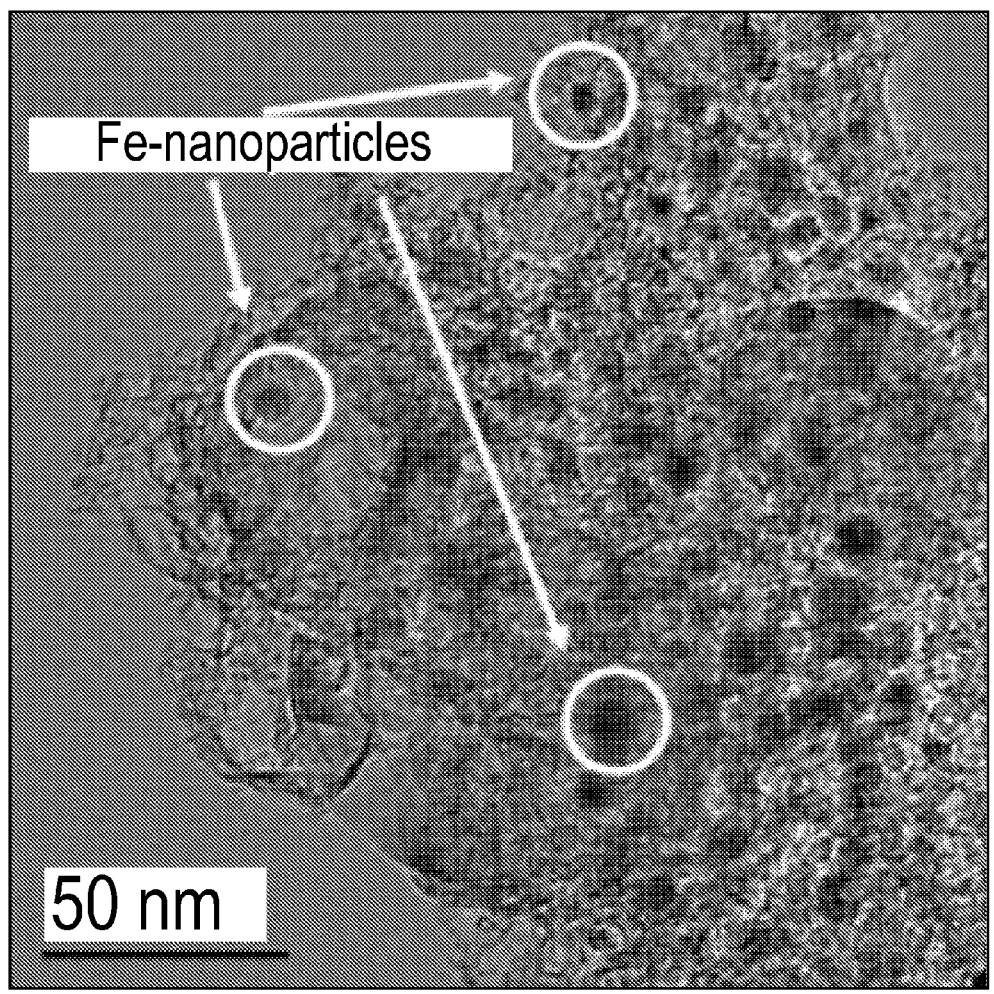
FIG. 5 is a TEM image of Fe-AAPyr catalyst showing the part of catalyst populated with Fe-nanoparticles.
Figure 6:
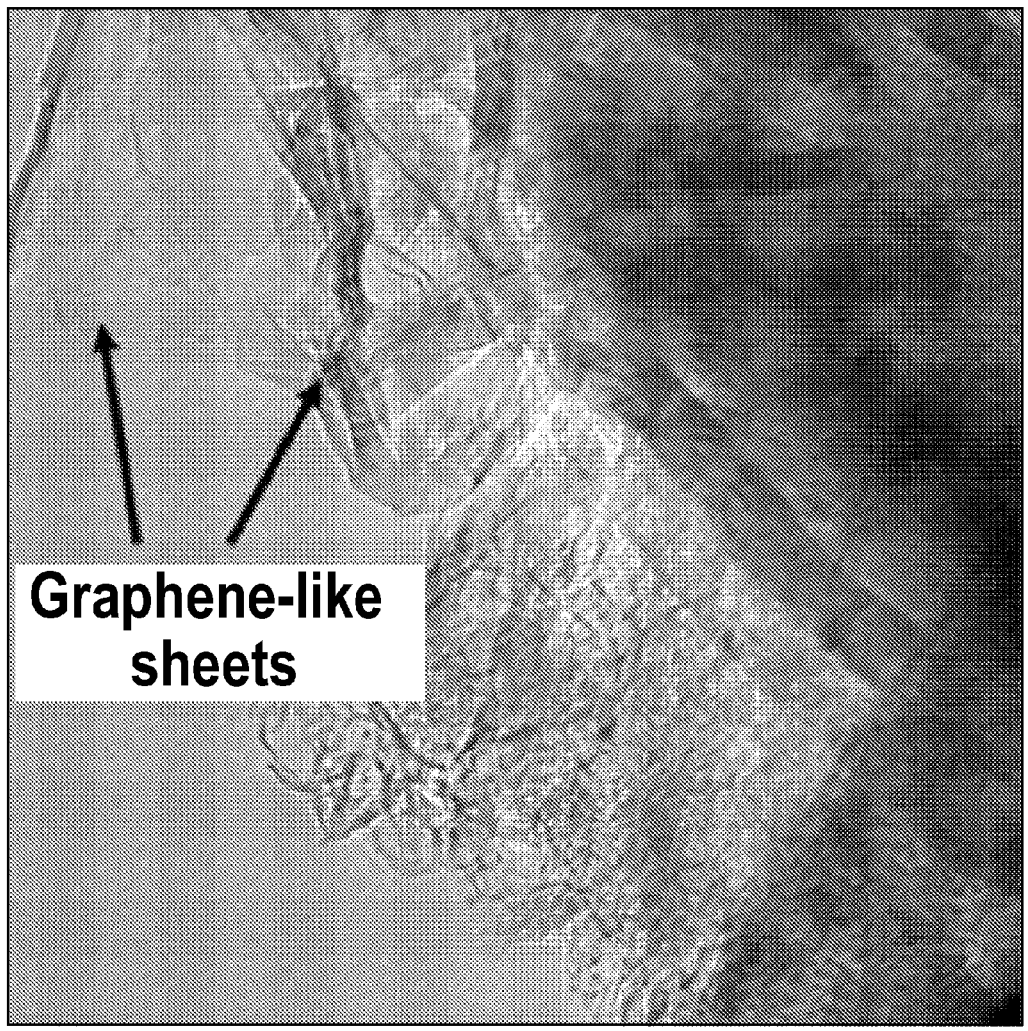
FIG. 6 is a TEM image of Fe-AAPyr catalyst showing part of catalyst displaying graphene-like sheets

TEM images obtained for Fe-AAPyr catalysts (FIGS. 5 and 6) show that material has highly heterogeneous nature. FIG. 5 depicts the part of the catalyst populated with iron nanoparticles. It should be mentioned that an aggressive leaching step with concentrated HF removes all iron and iron oxide phases which are deposited on carbon open-frame structure. The only metallic nanoparticles that remain, are those which imbedded into the carbon matrix and are thus protected by several graphite layers. It can be seen in FIG. 6 that some parts of catalyst have a morphology with graphene-like sheets. The presence of highly graphitic carbon in catalyst positively affects the material durability during of oxygen reduction.

Figure 7:
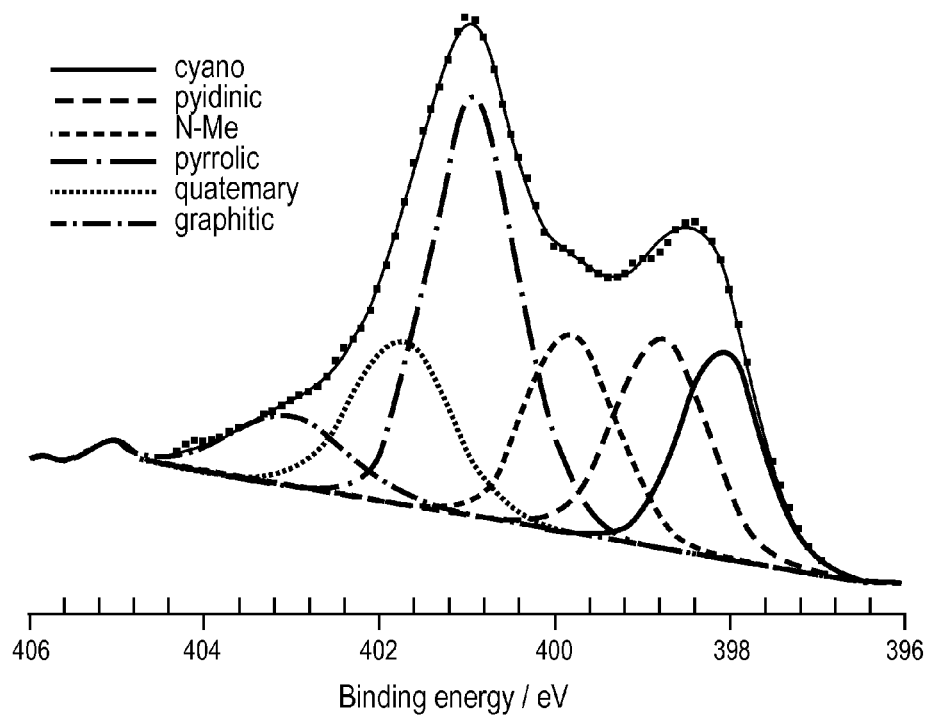
FIG. 7 is a graph showing high resolution N 1s spectra for Fe-AAPyr pyrolyzed at T=900° C. for 30 min.

The XPS analysis of the Fe-AAPyr catalyst is presented in FIG. 7. Nitrogen species detected by XPS are typical for these types of M-N—C systems, namely nitrile (398 eV), pyridinic (398.5 eV), N coordinated to Fe (399.7 eV), pyrrolic (401.5 eV), quaternary (402 eV) and graphitic (403.3 eV). A low Fe content of the catalyst at a level of 0.1-0.4 at % was detected due discussed previously HF leaching step of Sacrificial Support Method.

Figure 8:
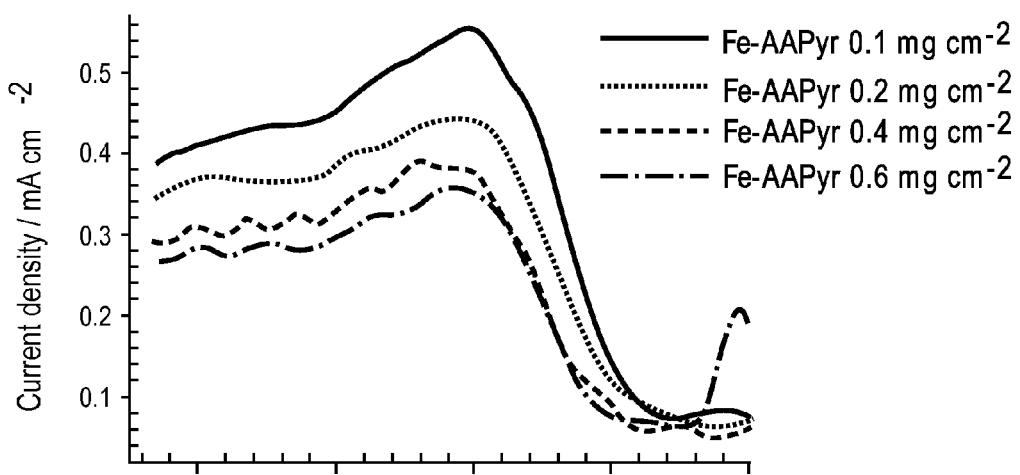
FIG. 8 is a graph showing RRDE data of oxygen reduction on Fe-AAPyr with various loadings. 1 M KOH saturated with $O_2$, 1200 RPM, 5 mV $s^{-1}$, 293 K. Ring potential was 1.5$V_{RHE}$, Ink composition was 5 mg of catalyst in 850 μL of IPA and 150 μL of 0.5 wt. % of Nafion®
Figure 9:
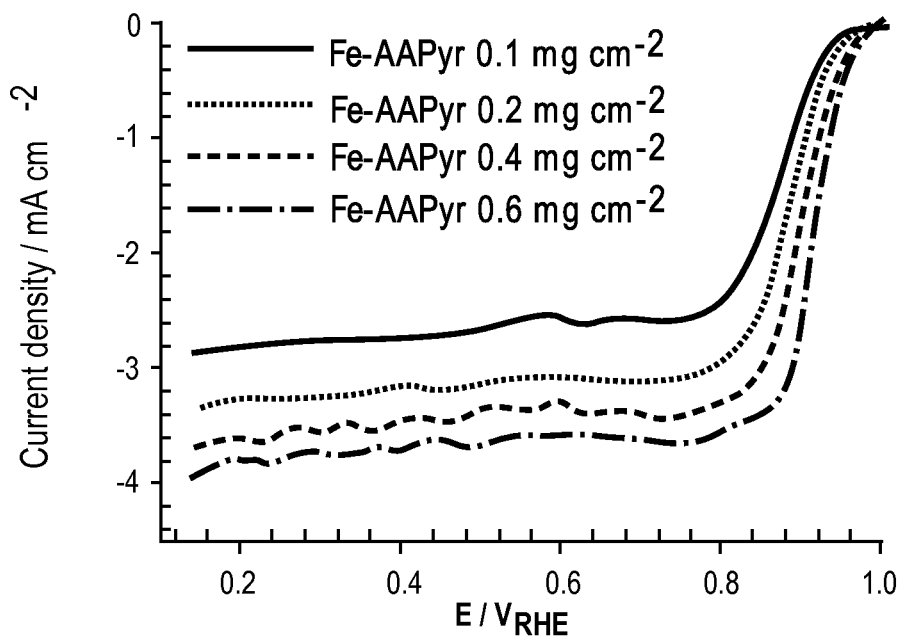
FIG. 9 is a graph showing RRDE data of oxygen reduction on Fe-AAPyr with various loadings. 1 M KOH saturated with $O_2$, 1200 RPM, 5 mV $s^{-1}$, 293 K. Ring potential was 1.5$V_{RHE}$, Ink composition was 5 mg of catalyst in 850 μL of IPA and 150 μL of 0.5 wt. % of Nafion®

FIGS. 8 and 9 show the catalytic behaviour for oxygen electroreduction of the Fe-AAPyr investigated by rotating ring disk electrode (RRDE) voltammetry. The ink for all RRDE experiments contained 5 mg of catalyst and 150λ, of 0.5 wt. % of Nafion®. Increasing the Fe-AAPyr loading from 0.1 to 0.6 mg cm$^{-2}$ increased the limiting current density and the half-wave potential ($E_{1/2}$) up to about 0.930 $V_{RHE}$. The $E_{1/2}$ for the oxygen reduction reaction (ORR) on Fe-AAPyr is higher than the $E_{1/2}$ on typical commercial Pt/C catalyst (results not shown). At the same time, the oxidation current on the ring at a potential of 1.5 $V_{RHE}$ due to $HO_2^-$ generated by $O_2$ reduction, decreased with increased catalyst loading. These findings are consistent with a 2×2e$^-$ mechanism with $HO_2^-$ as intermediate, where the total number of electrons exchanged increases with the Fe-AAPyr loading, reaching almost the theoretical four-electrons at 0.6 mg cm$^{-2}$.

Figure 10:
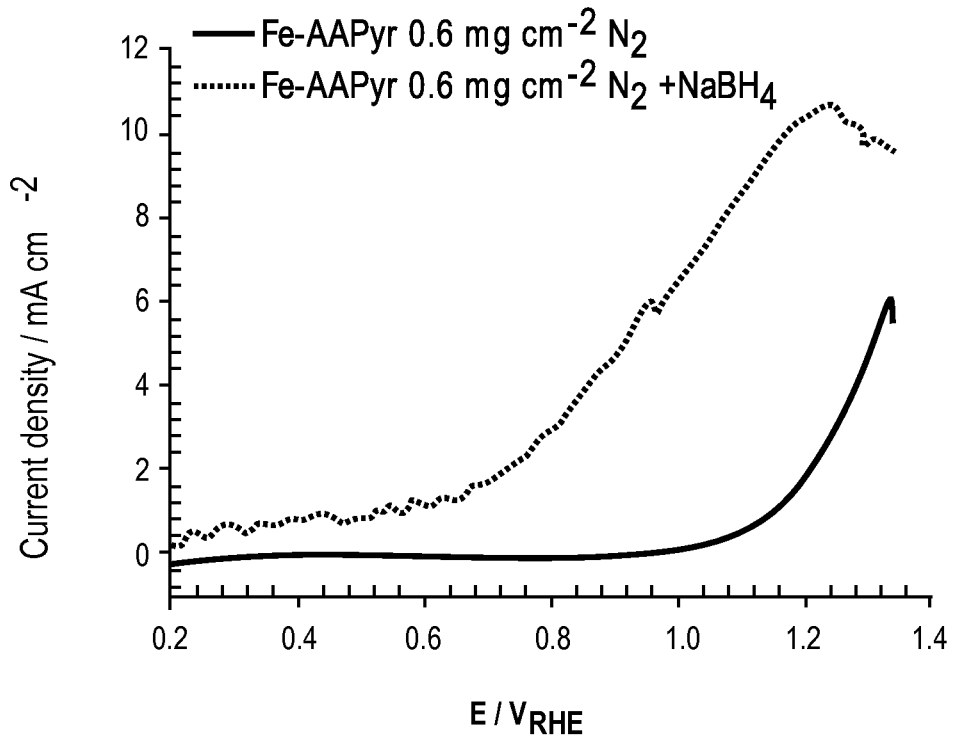
FIG. 10 is a graph showing data from linear voltammograms of Fe-AAPyr in $N_2$-saturated 2 M NaOH without and with 0.5 M $NaBH_4$. 1600 RPM, 20 mV $s^{-1}$, Fe-AAPyr loading of 0.6 mg $cm^{-2}$, 293 K.
Figure 11:
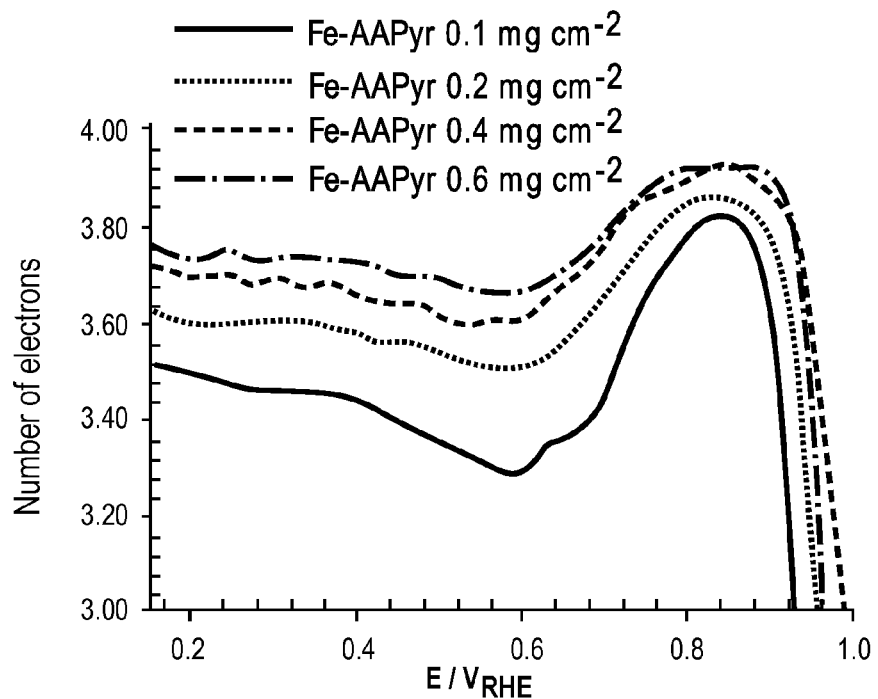
FIG. 11 is a graph showing RRDE data for the overall number of electrons transfer. 1M KOH saturated with $O_2$, 1200 RPM, 5 mV $s^{-1}$
Figure 12:
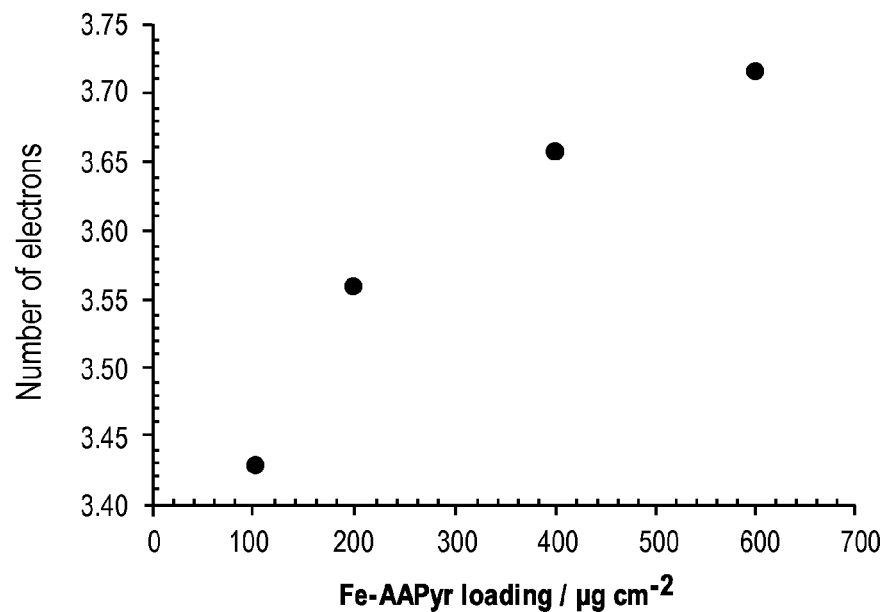
FIG. 12 is a graph showing RRDE data for the dependence of the overall number of electrons on loading at 0.35 V. 1M KOH saturated with $O_2$, 1200 RPM, 5 mV $s^{-1}$

FIG. 10 presents the linear voltammograms of the Fe-AAPyr catalyst in 2 M NaOH in the absence and presence of 0.5 M $NaBH_4$ to test the borohydride tolerance and catalyst selectivity of the new ORR catalyst. Without borohydride, $O_2$ evolution on Fe-AAPyr commences at 1.1 V vs. RHE. In the presence of $BH_4^-$, borohydride oxidation is not happening until 0.7 V vs. RHE (FIG. 10) which means Fe-AAPyr is a highly selective ORR catalyst for the mixed system. The mechanistic studies on Fe-AAPyr materials show direct dependence of $H_2O_2$ yield on the catalyst loading on the working electrode. Such behavior is the direct confirmation of 2×2e– mechanisms with the first step of oxygen being reduced to hydrogen peroxide followed by further electroreduction to water (FIGS. 11, 12), which further confirms the selectivity of FeAAPyr Furthermore, it is noted that the RRDE experiments were performed in alkaline liquid phase with dissolved $O_2$ and $BH_4^-$, respectively. However, the mixed-reactant fuel cell operates in a two-phase gas-liquid system. Therefore, in the absence of intrinsic cathode catalytic selectivity, the CCL must be engineered such that to limit the access of the alkaline $BH_4^-$ solution to the catalytic sites while allowing the $O_2$ gas mass transport. An optimum hydrophobic/hydrophilic pore structure balance must be achieved in the CCL to create efficient three-phase (gas/liquid/solid) reaction zones for ORR while avoiding flooding by the alkaline borohydride solution. For the preparation of the CCL in the mixed-reactant fuel cell, we have investigated the role of Vulcan XC-72 carbon and Nafion®, respectively, mixed with the Fe-AAPyr catalyst. The prepared CCL was tested in the SR-MRFC.

Figure 13:
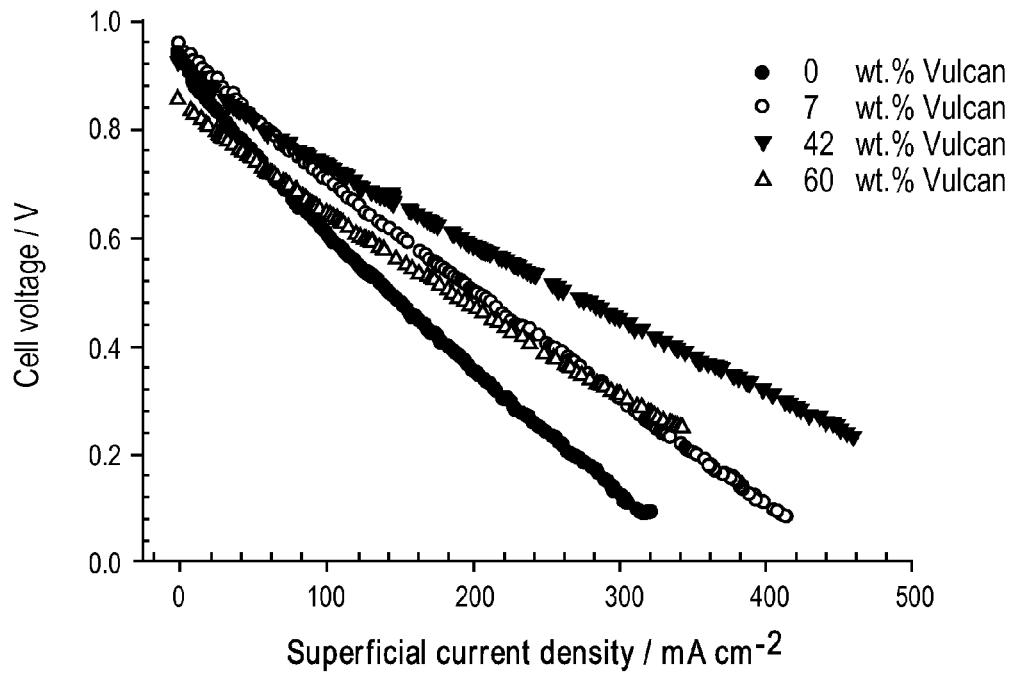
FIG. 13 is a polarization curve showing the effect of Vulcan XC-72 carbon (wt. %) content in the cathode catalyst layer on the performance of the Swiss-roll mixed-reactant DBFC. Cathode catalyst: Fe-AAPyr loading of 6 mg $cm^{-2}$, Nafion® content in the CCL: 30 wt. % Cathode GDL: 40 wt. % PTFE treated carbon cloth. Anode: Pt/C on carbon cloth (Pt loading of 0.8 mg $cm^{-2}$). Feed: 0.5 M $NaBH_4$-2 M NaOH, 12 mL $min^{-1}$, $O_2$: 10 SLPM. Temperature: 45° C., Pressure: 105 kPa(abs).
Figure 14:
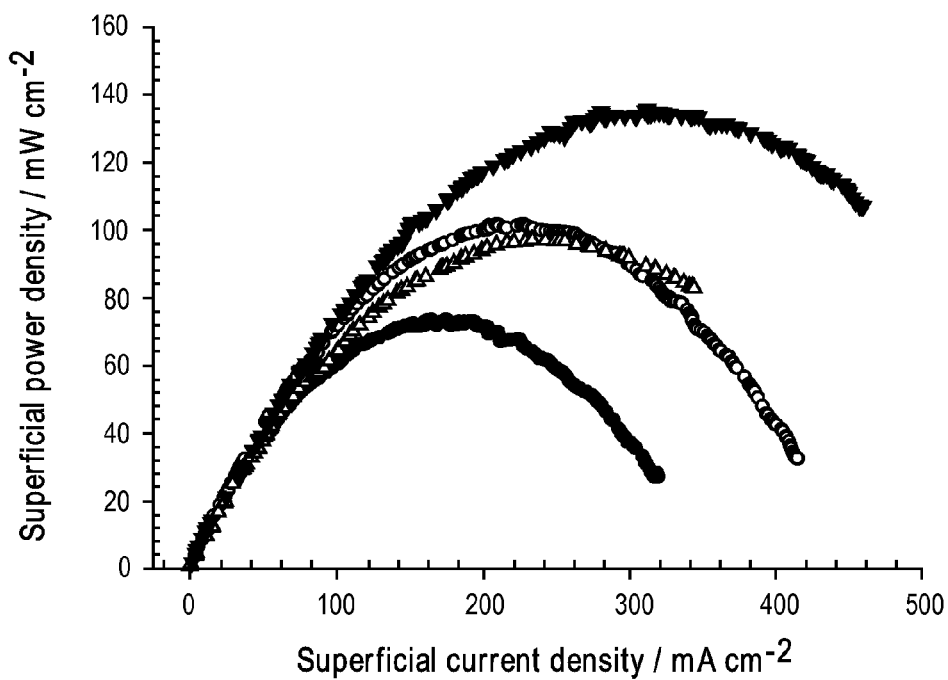
FIG. 14 is a graph showing the superficial power density. Cathode catalyst: Fe-AAPyr loading of 6 mg $cm^{-2}$, Nafion® content in the CCL: 30 wt. % Cathode GDL: 40 wt. % PTFE treated carbon cloth. Anode: Pt/C on carbon cloth (Pt loading of 0.8 mg $cm^{-2}$). Feed: 0.5 M $NaBH_4$-2 M NaOH, 12 mL $min^{-1}$, $O_2$: 10 SLPM. Temperature: 45° C., Pressure: 105 kPa(abs).

FIGS. 13 and 14 presents the effect of Vulcan XC-72 content in the CCL (between 0 wt. % and 60 wt. %) on the mixed-reactant Swiss-roll DBFC performance. The Nafion® content of the CCL was fixed at 30 wt. % for all the cases, whereas the Fe-AAPyr catalyst loading represents the balance to 100 wt. % such that the Fe-AAPyr loading was kept constant at 6 mg cm$^{-2}$. The anode was Pt/C with a loading of 0.8 mg cm$^{-2}$. In the absence of Vulcan XC-72 (i.e., the CCL is composed of 70 wt. % Fe-AAPyr and 30 wt. % Nafion®) there is an abrupt drop in the cell voltage starting from the open circuit voltage of 0.98 V (FIG. 13). This abrupt voltage drop in the electrode kinetic region of the polarization curve at current densities below 100 mA cm$^{-2}$, is due to the formation of a mixed potential on the cathode surface as a result of flooding by the alkaline borohydride solution. Addition of Vulcan XC-72 in the CCL at levels of 7 wt. % and 42 wt. %, respectively, improves significantly the polarization performance as shown by the increase of the superficial power density from 70 mW cm$^{-2}$ without Vulcan XC-72 to almost 140 mW cm$^{-2}$ with 42 wt. % Vulcan XC-72 (FIG. 14). This performance improvement is attributed to the enhancement of the $O_2$ gas transport to the active sites while at the same time the $BH_4^-$ mass transport in the hydrophobic porous CCL containing 42 wt. % Vulcan XC-72 is impeded. Hence, the overall selectivity of the CCL is improved by achieving an optimal hydrophobic-hydrophilic balance in the porous catalyst layer. The excellent selectivity of the CCL is also reflected by the high open circuit cell voltage of 0.97 V, which matches or exceeds those reported in the literature for the conventional dual-chamber membrane-separated DBFC.

Further increase of the Vulcan XC-72 content in the CCL from 42 wt. % to 60 wt. %, has no additional benefits and in fact is detrimental for the SR-MRFC performance as shown by decrease of both the open circuit cell voltage from 0.97 V to 0.84 V and the peak power density from 137 mW cm$^{-2}$ to 96 mW cm$^{-2}$. Two effects prevail in case of 60 wt. % Vulcan XC-72. First, the high carbon content of the CCL favors the two-electron reduction of $O_2$ generating $HO_2^-$ which lowers the fuel cell voltage. Second, the thick and tortuous CCL morphology when the carbon black content is 60 wt. % has a lower utilization of the catalytically active Fe-AAPyr sites.

Figure 15:
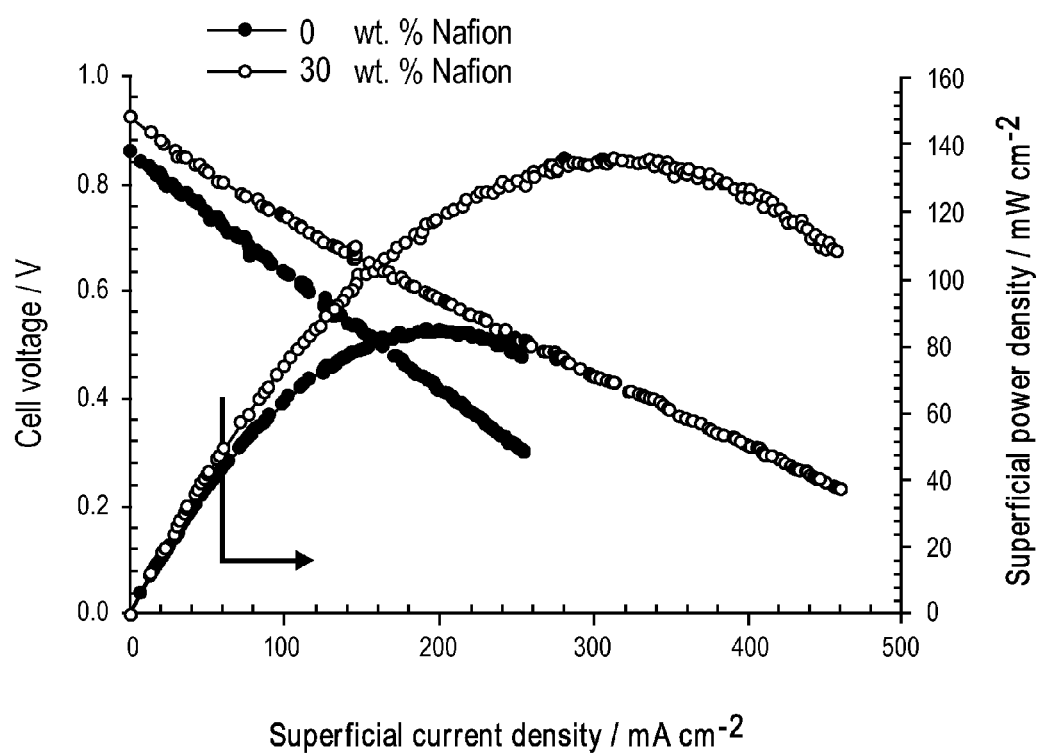
FIG. 15 is a graph showing the effect of Nafion® content in the CCL on the performance of the Swiss-roll mixed-reactant DBFC. Cathode catalyst: Fe-AAPyr loading of 6 mg $cm^{-2}$, 42 wt. % Vulcan, Nafion® content in the CCL: 0 or 30 wt. %, respectively.

Next we present the importance of the incorporation of Nafion® into the CCL. Using the optimal 42 wt. % Vulcan XC-72 content, FIG. 15 shows the impact of Nafion® incorporation in the CCL. The incorporation of Nafion® into the CCL serves three functions: (a) acts as a binder forming a cohesive catalyst layer, (b) imparts a certain degree of hydrophilicity to the CCL creating an effective three-phase (gas/solid/liquid) interface for ORR, and (c) enhances the ionic conductivity of the CCL. Therefore, by introducing 30 wt. % Nafion® in the CCL structure, the SR-MRFC peak power density increases from 84 to 137 mW cm$^{-2}$ at 45° C. Furthermore, the durability of the SR-MRFC was also investigated over a period of 200 min at a constant current density of 250 mA cm$^{-2}$ and 45° C. The cell voltage decrease was below the detection limit of our instrument (i.e., 100 μV), indicating excellent stability. For comparison, under similar conditions but using a $MnO_2$ GDE cathode the cell voltage drop was about 5 mV h$^{-1}$.

What is claimed is:

1. A method for producing a cathode for a mixed reactant fuel cell comprising:
    making a self-supporting porous cathode catalyst by:
        mixing metal, nitrogen, and carbon precursors with a plurality of dispersed sacrificial support particles under sufficient conditions to allow the metal, nitrogen and carbon precursors to coat the sacrificial support particles and form a metal-nitrogen-carbon (M-N—C) compound/sacrificial support matrix;
        heat treating the M-N—C compound/sacrificial support matrix to produce active sites in the matrix; and
        removing the sacrificial support, thereby producing a self-supporting porous catalyst;
    mixing the self-supporting porous catalyst with carbon black and an ionomer to form an ink;
    coating a flexible gas diffusion layer with the ink.

2. The method of claim 1 wherein the carbon black makes up no more than 60% of the ink.

3. The method of claim 1 wherein the ink contains 30% wt ionomer.

4. The method of claim 1 wherein the porous catalyst is loaded at between 0.1 and 0.6 mg cm-2.

5. The method of claim 1 wherein the porous catalyst is Fe-AAPyr.

6. The method of claim 1 wherein the gas diffusion layer comprises woven carbon fibers.

7. The method of claim 1 wherein the self-supporting porous catalyst comprises a bimodal pore distribution with a first distribution of pores in the 40-60 nm range and a second distribution of pores with an average diameter of approximately 200 nm range.

8. A method for producing a cathode for a mixed reactant fuel cell comprising:
   making a self-supporting porous cathode catalyst by:
      mixing Fe-AApyr precursors with a sacrificial support under sufficient conditions to allow the Fe-AApyr precursors to coat the sacrificial support and form a matrix;
      heat treating the matrix to produce active sites in the matrix; and
      removing the sacrificial support, thereby producing a self-supporting porous catalyst;
   mixing the self-supporting porous catalyst with carbon black and an ionomer to form an ink;
   coating a flexible gas diffusion layer with the ink.

9. The method of claim 8 wherein the carbon black makes up no more than 60% of the ink.

10. The method of claim 8 wherein the ink contains 30% wt ionomer.

11. The method of claim 8 wherein the porous catalyst is loaded at between 0.1 and 0.6 mg cm-2.

12. The method of claim 8 wherein the Fe-AAPyr precursors are aminoantipyrine and iron nitrate.

13. The method of claim 8 wherein the gas diffusion layer comprises woven carbon fibers.

14. The method of claim 8 wherein the self-supporting porous catalyst comprises a bimodal pore distribution with a first distribution of pores in the 40-60nm range and a second distribution of pores with an average diameter of approximately 200nm range.

* * * * *